United States Patent
Feng et al.

(10) Patent No.: US 7,062,342 B1
(45) Date of Patent: Jun. 13, 2006

(54) METHOD AND SYSTEM FOR FOUNDRY TAPE-OUT SERVICE REQUEST

(75) Inventors: Shu-Ling Feng, Hsinchu (TW); Ching-Hsien Chen, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 608 days.

(21) Appl. No.: 10/154,661

(22) Filed: May 24, 2002

(51) Int. Cl.
*G06F 19/00* (2006.01)

(52) U.S. Cl. .......................................... 700/97; 700/117
(58) Field of Classification Search ............... 700/95, 700/97, 117, 121, 236; 705/7, 8, 80
See application file for complete search history.

(56) References Cited

U.S. PATENT DOCUMENTS

| | | | |
|---|---|---|---|
| 6,180,293 B1 | 1/2001 | Tanaka et al. | 430/5 |
| 6,182,124 B1 | 1/2001 | Lau et al. | 709/217 |
| 6,714,828 B1 * | 3/2004 | Eldridge et al. | 700/97 |

* cited by examiner

*Primary Examiner*—Leo Picard
*Assistant Examiner*—Sheela S. Rao

(74) *Attorney, Agent, or Firm*—Haynes and Boone, LLP

(57) ABSTRACT

A system for automatically receiving, verifying, and processing a request of a fabricating organization for manufacture of a product executes a method for verifying a request of a fabricating organization for manufacture of a product begins by receiving the request for manufacture of the product from a design organization. An acknowledgement of the request is generated and transferred to the design organization. The request is then verified that a format and syntax of the request complies with requirements for format and syntax of the request as established by the fabricating organization. If the format and syntax does not comply with the requirements for the format and syntax, the request is rejected for manufacture. However, if the format and syntax has minor non-compliances to the requirements for format and syntax, the minor non-compliances are corrected such that the request is in compliance to the requirements for format and syntax. When the format and syntax is in compliance with the requirements, transferring the request to initiate manufacture of the product. The verification of the request begins by examining the request for manufacture to verify that tools required for the manufacture are correctly identified. The verification of the request continues with examining the request for manufacture to verify that process steps required for the manufacture are correctly identified. The verification continues with examining the request for manufacture to verify that product fabrication instructions required for the manufacture have a correct syntax.

55 Claims, 8 Drawing Sheets

FIG. 1 – Prior Art

METHOD AND SYSTEM FOR FOUNDRY TAPE-OUT SERVICE REQUEST

BACKGROUND OF THE INVENTION

1. Field of the Invention

This invention relates to methods and systems for a customer to request manufacture of a product by fabrication organization. More particularly this invention relates to a customer requesting fabrication of an integrated circuit on a substrate by a semiconductor foundry. Even more particularly, this invention relates to transmission of a service request with a computer aided design data from a customer to the foundry.

2. Description of Related Art

The design of a product involves not only defining the form and function of the product, but also the various tools and templates necessary to manufacture the product must be defined. Further, the various process steps must be enumerated to detail the procedure for manufacture from the raw material to the finished product. A set of design instructions is necessary to define the physical structure of any templates employed in the manufacture of the product.

In present organizational structures, the design organization is often separate from the manufacturing organization. In many instances, the designing organization is a corporate entity separate from the manufacturing organization. The design organization may not have or may not wish to invest the necessary capital to acquire and maintain the necessary equipment to manufacture a product.

As the design organization has become more remote from the manufacturing organization and the equipment of manufacture has become more automated, the communication of the design information must become more standardized and must comply with certain rules of format and syntax. In the electronic industry, design organizations communicate with manufacturing organization with a service request and a "tape-out". The service request defines the types of masks or templates required to define the layers of an integrated circuit and the process routing as the product or substrate to fabricated to integrated circuits proceeds through the factory or semiconductor foundry. The "tape-out" defines the instructions for fabricating the templates or masks. Presently, these instructions for fabricating the masks are encoded as digital data transferred through communication networks.

A customer engineering representative acts as an interface between the design organization and the manufacturing organization to provide the necessary process definitions, design rules, and the format and syntax rules to allow the design organization the ability to correctly translate their product design to data in the format and syntax necessary to permit the manufacturing organization to fabricate the product. The design organization transfers this design data to the manufacturing organization. The customer engineering representative reviews the service request and validates that the types of tools and templates (masks) are correctly identified. The customer engineering representative then reviews the service request to ensure that the process steps are correctly defined and the work-in-process product is correctly controlled. Finally, the customer engineer then examines the data defining the templates to determine that the data complies with the rules for the format and syntax.

Any errors encountered during this process are sufficient reason to reject the request. The customer must then be informed and correct any of the errors. If the errors are minor, the customer engineering representative may correct the errors. This often requires manual entry of the information that is prone to error.

Refer now to FIG. 1 for a description of the transfer of a service request for fabrication of an integrated circuit on a substrate. The procedures of the processing are divided into the three phases. The customer preparation phase 10 has the customer (design organization) creating the design with the service request including the "tape-out" structure of the masks required for the fabrication. The customer 12 issues (Box 14) the service request, which is stored and retained (Box 16) as a draft. The initial draft of the service request is then submitted and transferred (Box 18) to the manufacturing organization for processing. The customer engineering representative is responsible for the review and verification phase 20. Receipt of the service request is acknowledged (Box 22) by the customer engineering representative. The service request is then verified (Box 24) for the correct format and syntax. The customer engineering representative must review the service request to insure that the process tools and masks for the various processing steps are correctly identified, that the process steps and handling instructions comply with the process capabilities of the manufacturing organization and that any special handling instructions are identified and emphasized for the fabrication organization. Finally the data of the mask layers is reviewed for correct format and syntax. If there are previous versions of the product, the masks are checked against the previous versions to identify the difference and check that the differences are correct.

The verification procedure (Box 24) is then checked (Box 26) for errors. If the errors are severe, the service request (Box 27) is rejected and returned to the customer 12 for recreation. If the errors are minor, the service request is modified (Box 28) by the customer engineering representative, with the results transferred to the customer 12 for verification. Upon verification of the modification or if the service request is correct initially, the service request is submitted (Box 32) to the fabrication organization for manufacture. The manufacture phase 30 is performed by the production control (PC) unit 36 that controls scheduling of the manufacture, the fabrication engineering 36, which details the necessary processes and their attendant tooling, and the mask tooling group 34, which are responsible for the generation of the masks from the tape-out data. The successful completion of the service request with the tape-out data allows expeditious fabrication of the integrated circuit on a substrate.

Traditionally the efforts of the customer engineering representative are manual and any modifications to the service request require tedious labor-intensive entry of any modifications (Box 28).

U.S. Pat. No. 6,182,124 (Lau, et al.) describes a token-based deadline enforcement system for electronic document submission. The token-based deadline enforcement system for electronic document submission, a submission requirements center collects information on submission requirements (e.g., deadlines for submitting bids in response to commercial tenders), from the processing environments that generate the requirements. A gateway to a network of potential submitters polls the information collected in the submission requirements center, and generates tokens corresponding to current submission time limits. These tokens are available to all potential submitters until expiration of the corresponding time limit for the submission. On receiving a request for electronic submission from a submitting program, the gateway searches its records for the token corresponding to the submission type. If the token is located, it is returned to the submitting program for packaging with the submission. If the token is not located, an electronic message, such as an error flag, is returned to the submitting program, and the submitter knows immediately that the submission did not meet the deadline. When a submission packaged with a valid token is received at the gateway, it can be routed directly to the processing environment that generated the submission requirement The valid token provides an on-time validity check; the receiving processing environment does not have to check the submission as it arrives to ensure that it has been filed on time, but can delay processing to a convenient time, to verify compliance with substantive requirements for filing the submission. This scheme provides the submitter with immediate feedback whether the submission has been accepted for filing within the deadline. Possible performance problems in trying to process "time of filing" for a large number of submissions filed virtually simultaneously as the submission deadline draws near, are avoided. Also, the submitter is saved network access costs in waiting for a verification of filing to be returned.

U.S. Pat. No. 6,180,293 (Tanaka, et al.) describes a mask pattern preparing method used for forming a desired pattern on a substrate to be exposed. The method allows correction of pattern data on a substrate employing a device such as an electron beam writing device to allow direct writing of the features of a substrate.

SUMMARY OF THE INVENTION

An object of this invention is to provide a method for automatically receiving, verifying, and processing a request of a fabricating organization for manufacture of a product.

To accomplish this and other objectives a method for processing and verifying a request of a fabricating organization for manufacture of a product begins by receiving the request for manufacture of the product from a design organization. An acknowledgement of the request is generated and transferred to the design organization. The request is then verified that a format and syntax of the request complies with requirements for format and syntax of the request as established by the fabricating organization. If the format and syntax does not comply with the requirements for the format and syntax, the request is rejected for manufacture. However, if the format and syntax has minor non-compliances to the requirements for format and syntax, the minor non-compliances are corrected such that the request is in compliance to the requirements for format and syntax. When the format and syntax is in compliance with the requirements, transferring the request to initiate manufacture of the product.

The verification of the request begins by examining the request for manufacture to verify that tools required for the manufacture are correctly identified. The verification of the request continues with examining the request for manufacture to verify that process steps required for the manufacture are correctly identified. The verification continues with examining the request for manufacture to verify that product fabrication instructions required for the manufacture have a correct syntax.

The examining the request for manufacture to verify that the tools required are correctly identified begins with determining if specific tooling is required. If specific tooling is required, the examining continues with determining if tooling decisions. Tooling decisions being logical operations in the process to control the use of certain tools or process variations. If tooling decisions are required, the request is examined to determine that instructions for the tooling decisions have correct syntax. If the instructions have an incorrect syntax, an error message is generated to have the instructions for the tooling decisions corrected. Upon receipt of the error message to have the instructions for the tooling decisions corrected; the instructions for the tooling decisions are corrected and the request is transferred to the customer design organization for verification.

The examining the request for manufacture to verify that the tools required are correctly identified also entails determining if specific tooling is required. If specific tooling is required, any specific tooling instructions are examined for completeness. If any specific tooling instructions are incomplete, the specific tooling instructions are corrected and the request is transferred to the customer design organization for verification. With receipt of the complete tooling instructions, the specific tooling instructions are verified that they comply with the format for manufacture of the product. If the specific tooling instructions do not comply with the format for manufacture of the product, the specific tooling instructions are corrected and the request is transferred to the customer design organization for verification.

The examining the request for manufacture to verify that process steps required for the manufacture are correctly identified begins with determining if special process steps for the manufacture of the product are required. The special process steps for the manufacture of the product compared to the process steps of similar product being manufactured to determine that the process steps are equivalent to process steps of similar product being manufactured. Any differences of the special process steps from the process steps of the similar product are identified and the special process steps differing from the process steps of similar product being manufactured are verified that they are correct.

The examining the request for manufacture to verify that the product fabrication instructions required for the manufacture have a correct syntax begins with comparing the product fabrication instructions required for the manufacture with product fabrication instruction for previous similar product. If the product fabrication instructions do not compare correctly, the product fabrication instructions are corrected. If the product fabrication instructions do compare correctly, the product fabrication instructions are assessed that they comply with rules for syntax.

The tools required for the fabrication of the product are descriptions of masks employed in fabrication of the electronic circuits on a substrate. The process steps for the fabrication of the product are lot handling instructions employed during fabrication of electronic circuits on the substrate. The product fabrication instructions for manufacture of the product describe masking level details for masks employed for fabrication of electronic circuits on the substrate.

DETAILED DESCRIPTION OF THE INVENTION

Figure 1:
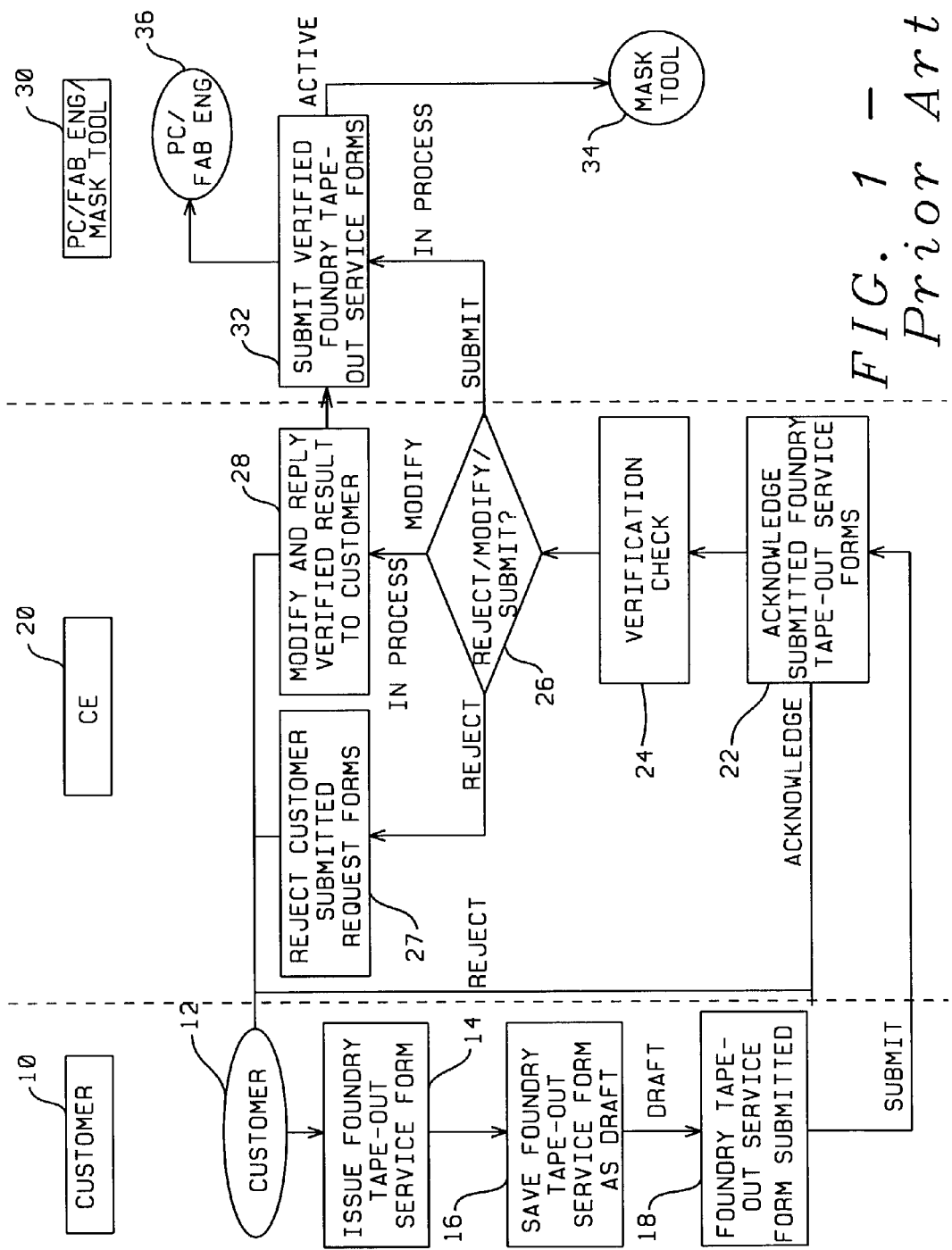
FIG. 1 is flow diagram of the method for processing and verifying a request for fabricating an electronic circuit on a substrate of the prior art.
Figure 2:
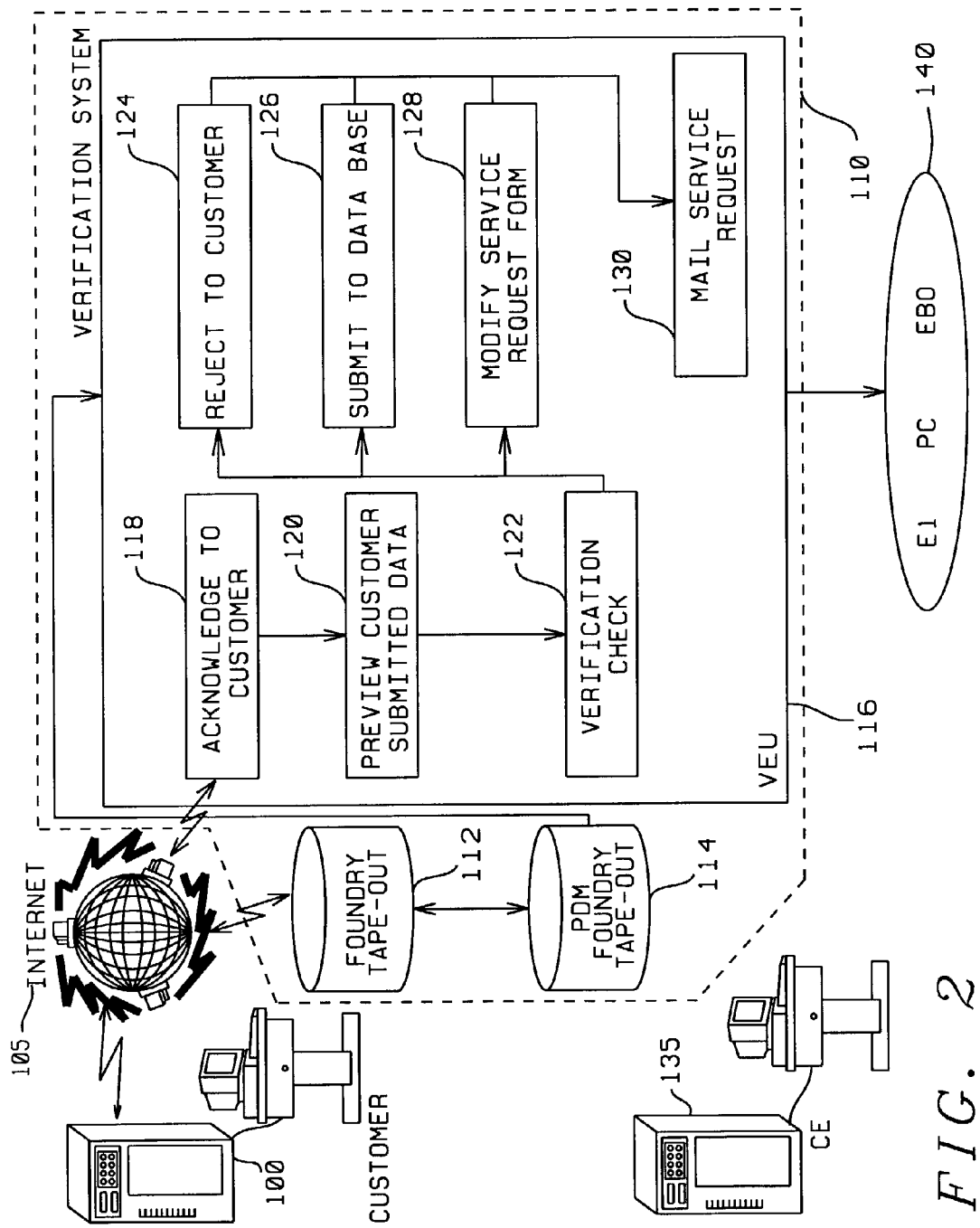
FIG. 2 is a diagram of a system for processing and verifying a request for fabricating an electronic circuit on a substrate of this invention.

With the improvement and development of computer aided design systems and programs, the foundry customer design organizations are able to develop larger and more sophisticated designs in a faster time. Further, the development of large global computer networks such as the Internet, the customer design organizations are able to obtain necessary foundry process descriptions to aid the design organization in design of integrated circuits. The automatic retrieval of the design information is enhanced by the ability to submit extremely large and complex designs to the foundry through the global communications network. To facilitate the submission of the request for fabrication of newly designed or newly modified integrated circuits upon a substrate, the request is submitted to a processing and verification system of this invention as shown in FIG. 2.

The customer 100 is in communication with the foundry verification system 110 through a global communication network 105 such as the Internet. The foundry may have a public or private interface commonly called a "web page" containing the necessary information for the customer 100 to create their product design. When the product design is completed, the customer 100 generates the request for fabrication of the product complete with the "tape-out" containing the descriptions of the masks or templates of the tooling necessary to fabricate the product. In the case of an integrated circuit each mask description provides the areas of a substrate that are to protected or exposed for application or removal of material necessary to create the electronic devices and circuits of the integrated circuit.

The customer 100 transfers the request to fabricate the product with the "tape-out" through the Internet 105 to input/output devices connected between the Internet 105 and the foundry data retention devices 112 within the verification system 110. The data retention devices 112 are generally magnetic disks capable of retaining large amounts of digital data describing the formation of the masks. The data retention devices 112 act as an archive to hold the original request for fabrication with its "tape-out" data. The product data management (PDM) data retention devices 114 receive copies of the request for fabrication with its "tape-out" data for processing by the verification execution unit 116.

When the verification execution unit 116 accesses the request for fabrication with its "tape-out" data, the verification execution unit 116 executes the method for processing and verifying the request for fabrication. The verification execution unit 116 acknowledges (Box 118) receipt of the request from the customer 100. The acknowledgement (Box 118) is an electronic message (email) transmitted through the Internet 105 to the customer 100. The customer engineer can review (Box 120) the request for fabrication and then transfer the request for verification checking (Box 122). Upon completion of the verification checking (Box 122), if the request contains errors that are not convenient to correct, the request is rejected (Box 124) and an electronic message is forwarded through an automatic mail service request (Box 130) to the customer 100. If the request contains only minor errors in format and syntax, the customer engineering representative 135 is directed to provide the necessary modifications (Box 128). Upon correction of the request or if the request is initially correct, the request with the tape-out data is submitted (Box 126) to the fabricating organization 140 for fabrication. The customer engineering representative 135, the customer 100, and the fabricating organization 140 are informed by an electronic message through a mail service request (Box 130) that the request for fabrication is successfully verified.

The fabrication organization 140 includes the production control unit (PC), the fabrication engineering unit (E1), and the mask tooling unit (EBO). The production control unit is charged with the responsibility for scheduling the manufacture of all the products to be fabricated. The fabrication engineering unit details and describes the processes and equipment necessary for the manufacture. The mask tooling unit is responsible for the formation of the necessary masks for each process in the fabrication of the integrated circuits on the substrate.

Figure 3:
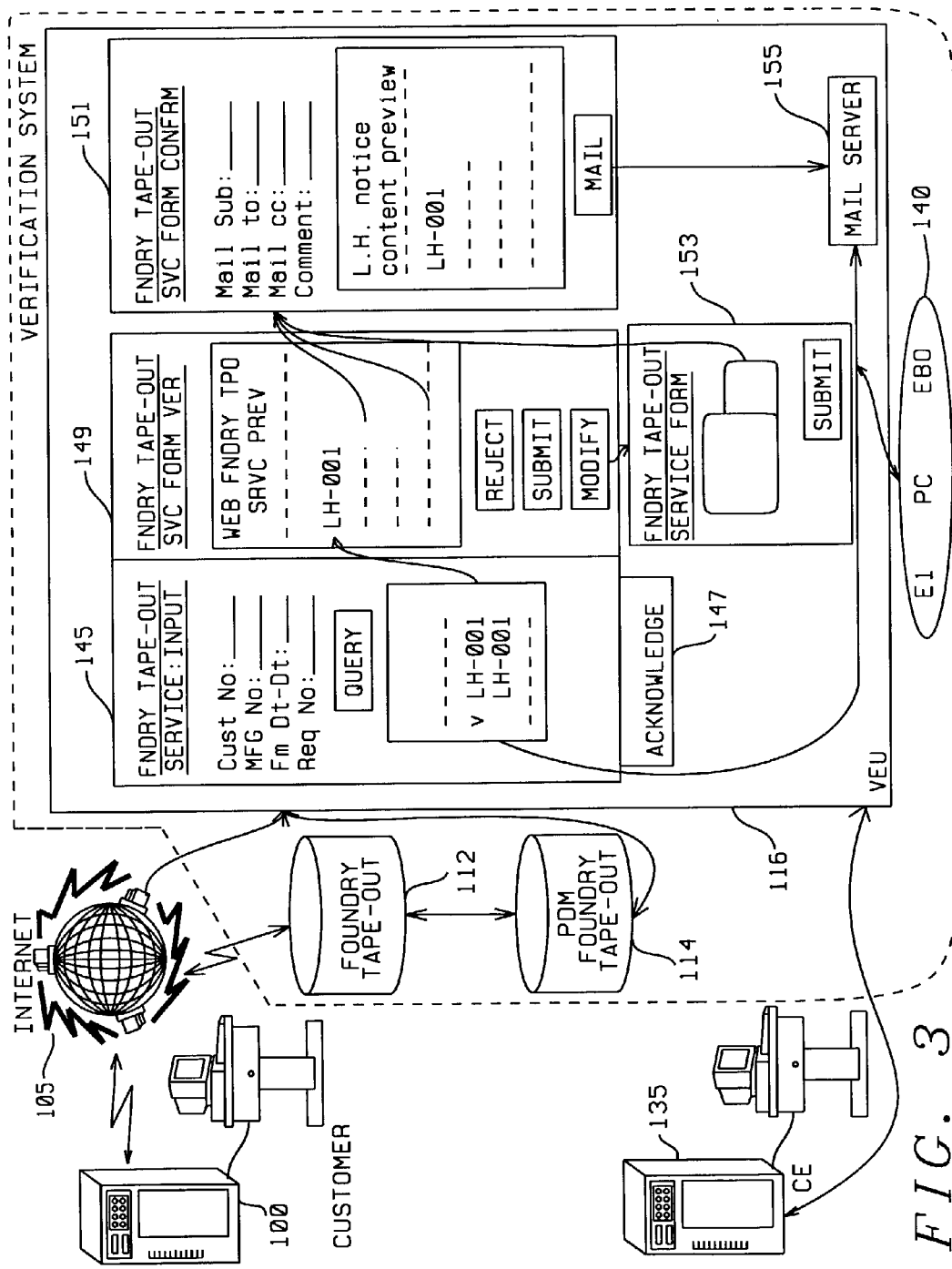
FIG. 3 is a diagram of a verification system for processing and verifying a request for fabricating an electronic circuit on a substrate of this invention illustrating the communication messages generated by the verification system.

Refer now to FIG. 3. for a description of the electronic forms employed by the verification execution unit 116 to process and verify the request for fabrication. The customer engineering representative 135 uses the input form 145 to form a query to access the request for fabrication from the product data management data retention device 114. Upon accessing the request for fabrication, the acknowledgement 147 is automatically generated and transferred to the mail server 155 as an electronic message to be transferred through the Internet to the customer 100 acknowledging receipt of the request for fabrication.

Subsequent to the preview (Box 120 of FIG. 2) of the request for fabrication by customer engineering representative 135, the request is verified (Box 122) for format and syntax. The verification form 149 identifies any errors and requests a determination by the customer engineering representative whether the request is to be rejected, modified or submitted to the fabrication organization 140. When the request has been verified as correct, the request confirmation form 151 is transmitted to the mail server 155 for dispatching to the customer 100, the customer engineering representative 135, and the fabrication organization 140.

Figure 4:
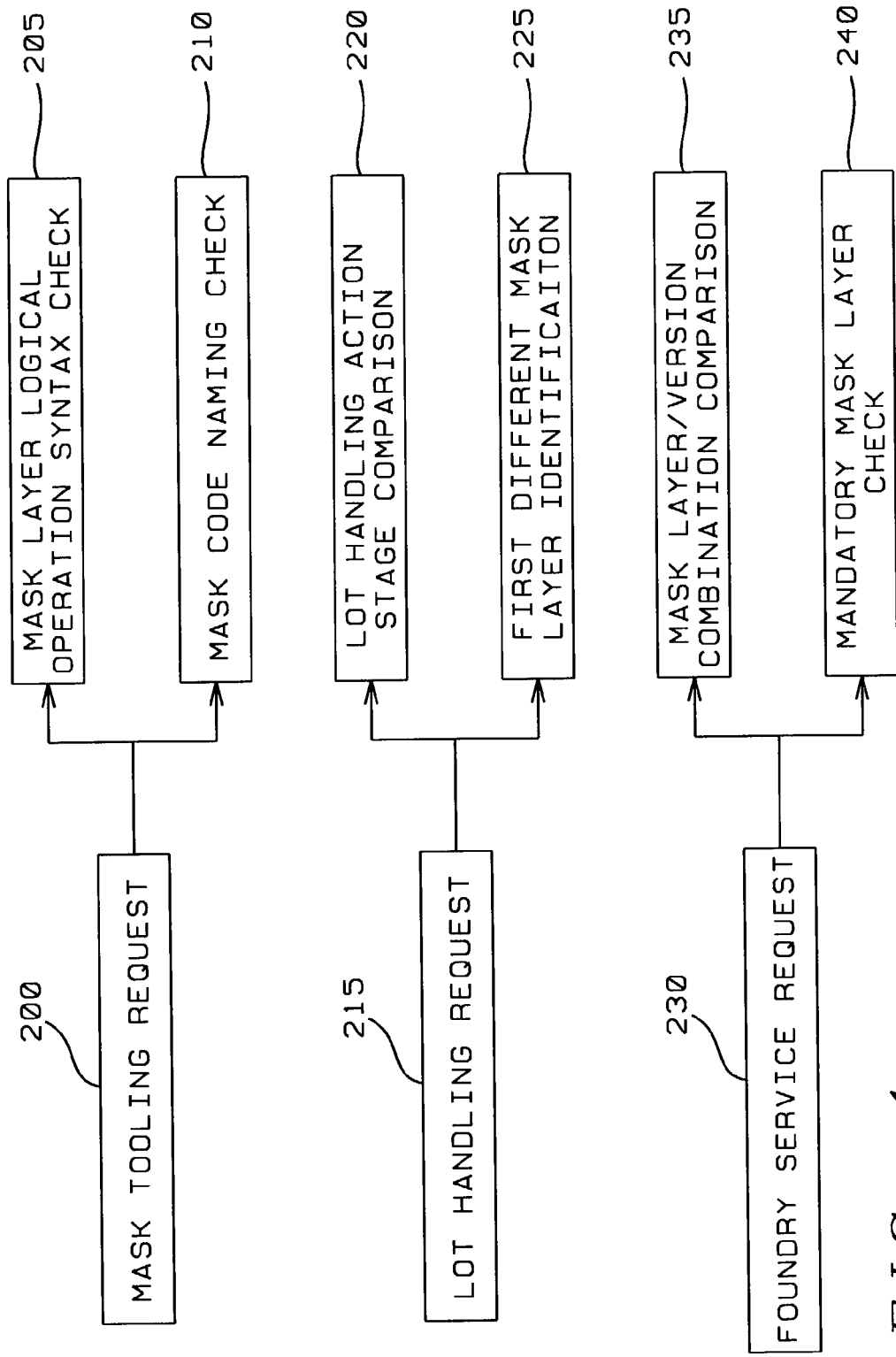
FIG. 4 is a flow diagram illustrating procedures for verifying the contents of the request for fabricating an electronic circuit on a substrate of this invention.

The verification (Box 118 of FIG. 2) of the request involves reviewing the request for definition of contents of the request for fabrication. The contents of the request are for a mask tooling request, a lot handling request, and a foundry service request. The mask tooling request defines the types of masks required for the processing. The lot handling request defines the types of processes required and the sequence and timing of the processes. The foundry service request details the masks employed in the processing to insure the correct mask versions and combinations are correct. Further the foundry service request checks that the mask descriptions meet the format and syntax acceptable by the fabrication organization 140. The method for verification of the request for fabrication is shown in FIG. 4. The request for fabrication does not require any or all of the mask tooling request, the lot handling request, or the foundry service request.

If the request for fabrication contains a mask tooling request (Box 200), the verification execution unit 116 of FIG. 2 then determines if a mask layer logical operation is required (Box 205). The logical operations are required in mask tooling form is in the case when multiple CAD Computer Added Design) layers are combined as one final mask layer by logical operations, such as NOT, AND, OR, SIZING etc. For example: Mask 130 is formed with the logical operation is ((((3 AND 5) OR 8) NOT 9) SIZING 0.04). This indicates that Mask 130 is formed by the combination of CAD layers 3 and 5 or CAD layer 8 and excludes CAD layer 9. This completed with a scaling factor of 0.04. As can be seen from the above Masks are formed by the substitution of various CAD layers depending upon the logical operation required.

Figure 5A:
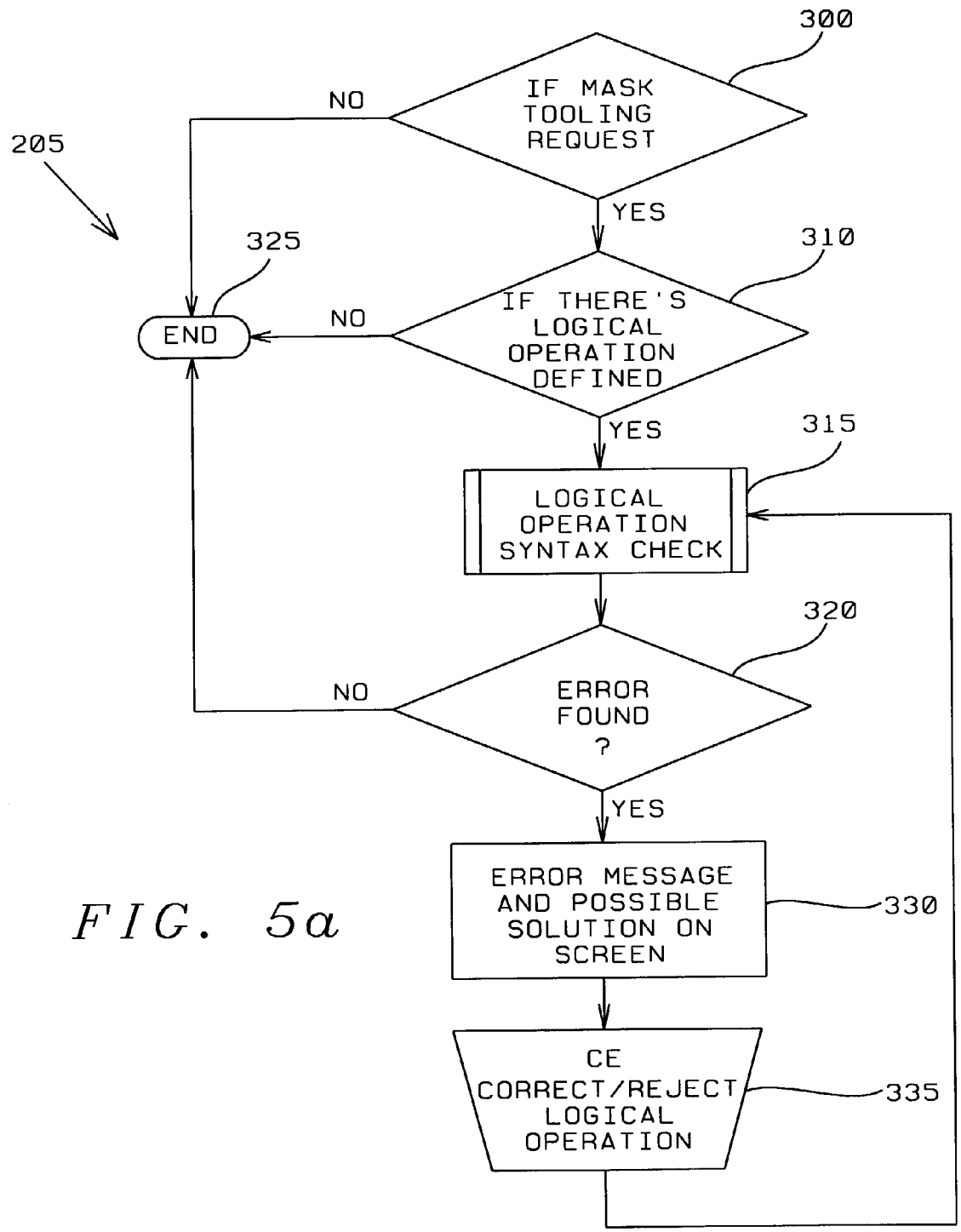
FIGS. 5a, 5b, 6, and 7 are flow diagrams illustrating the details of the procedures for verifying the contents of the request for fabricating an electronic circuit on a substrate of this invention of FIG. 4.

Refer now to FIG. 5a for a discussion of the steps of the procedure for the checking (Box 205) of the mask layer logical operation syntax. The request for fabrication is inspected (Box 300) that there is a request for a mask tooling. If there is a request for mask tooling, the request is then inspected further if a logical operation is defined (Box 305). If the logical operation is defined, the syntax of the logical operation is reviewed for format and syntax (Box 315). The syntax is checked (Box 320) for invalid format or syntax. If there is an invalid format or syntax, an error message is generated (Box 330) and transferred to the customer engineering representative 135 of FIG. 2. The customer engineering representative either corrects (Box 335) the error in format or syntax if minor or rejects the request. The syntax is checked (Box 320) again for invalid format or syntax and if correct the process ends (Box 325).

Figure 5B:
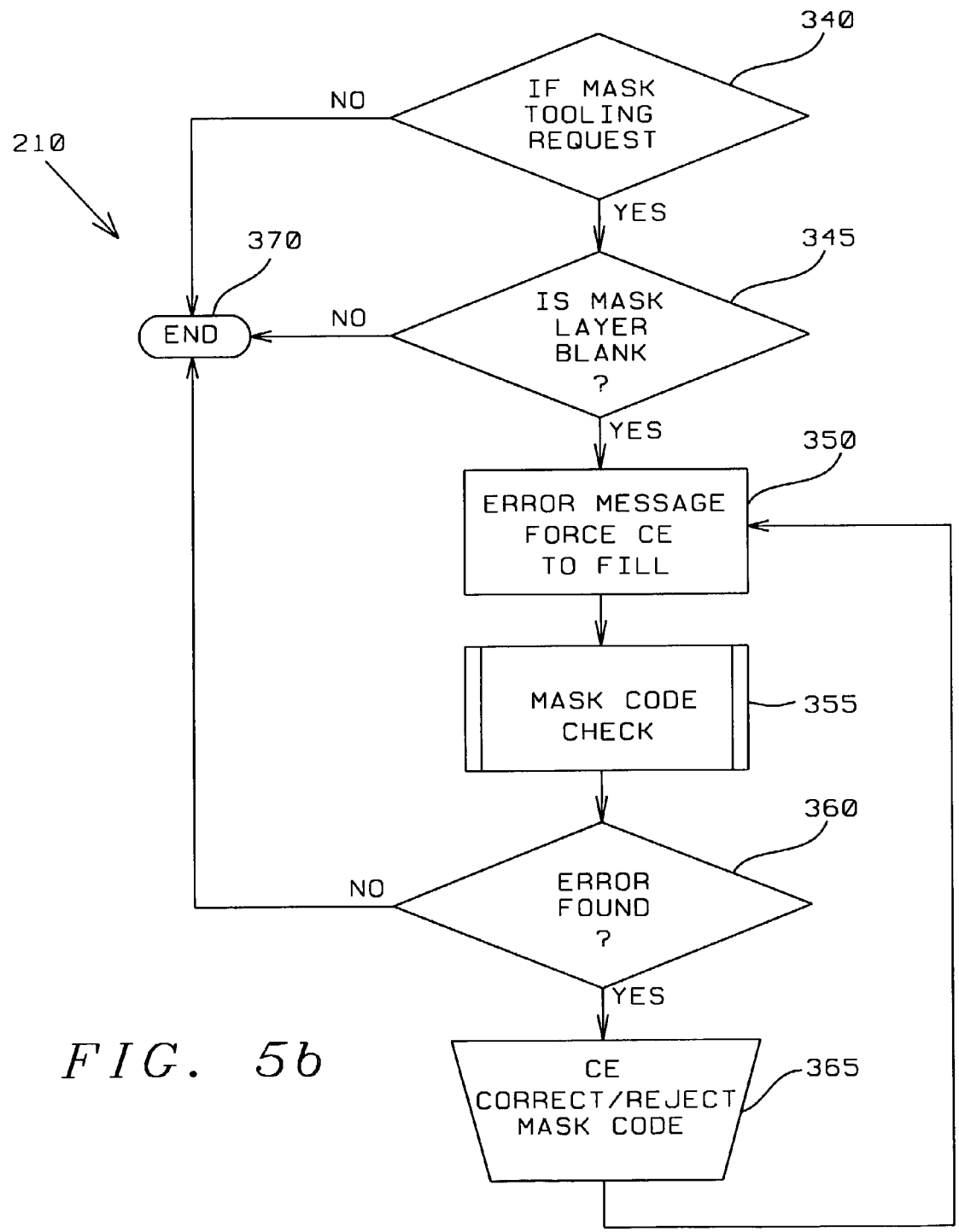

Referring back now to FIG. 4, if there is a mask tooling request, the syntax and format of the masking encoding is reviewed (Box 210). Refer now to FIG. 5b for a discussion of the review (Box 210) of the mask encoding. The request for fabrication is inspected (Box 340) that there is a request for a mask tooling. If there is a request for mask tooling, the request is then inspected further if a mask layer is blank (Box 345). If a mask layer is blank, the customer engineering representative 135 receives an alert informing of the blank mask layer. The customer engineering representative 135 determines the cause of the blank mask layer and provides (Box 350) the appropriate mask information. The request is again inspected (Box 345) to insure that the correct contents for the mask are present. The tape-out data provided with the request is then examined (Box 355) to insure that the format and syntax of the mask coding complies with the requirements of the fabrication organization. The mask coding is checked (Box 360) for an error. If there is an error in the mask coding, the customer engineering representative 135 receives an alert informing of the mask coding error. The customer engineering representative 135 determines the cause of the mask coding error and provides (Box 365) the appropriate mask coding information. The mask coding is reexamined (Box 355) to insure the compliance of the format and syntax of the mask coding and the process ends (Box 370).

Figure 6:
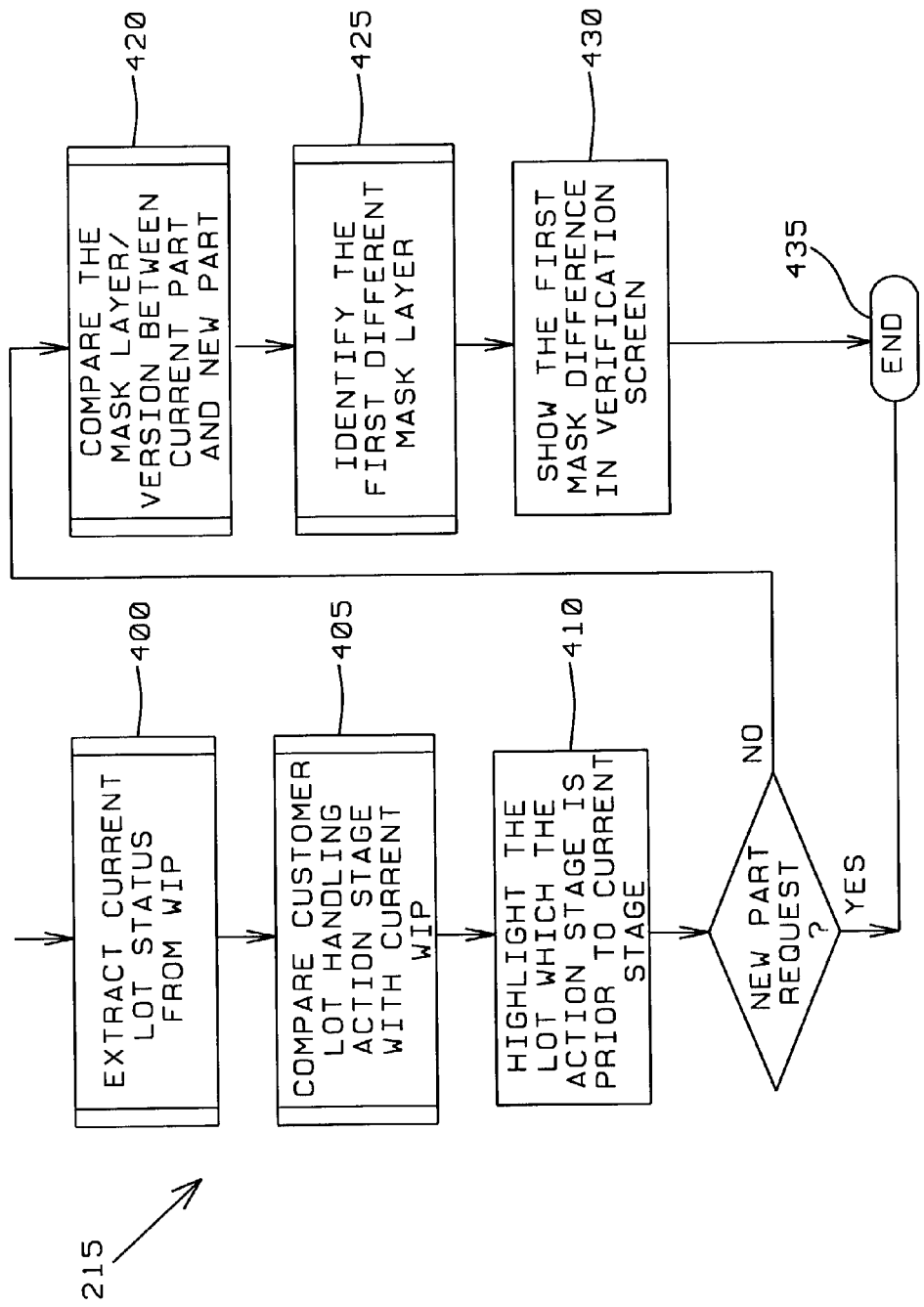

If the request for fabrication contains a lot handling request (Box 215), the verification execution unit 116 of FIG. 2 then performs a lot stage comparison (Box 220) and mask difference identification (Box 225). The lot stage comparison (Box 220) compares the process steps and handling requirements of previous similar product to insure that the handling instructions are comparable. The mask difference identification (Box 225) identifies the masking layer where the requested product differs from previous similar product. Refer now to FIG. 6 for a discussion of the steps of the method (Box 215) for verification of the request for specific handling of the product during processing.

If the request for fabrication contains a lot handling request (Box 215), the verification execution unit 116 of FIG. 2 then extracts (Box 400) the current lot status from the fabrication organization 140 for current product in manufacture or work-in-process (WIP). The lot handling instructions of the current request for fabrication are compared (Box 405) to the lot handling instructions of the current product in manufacture. The differences in the lot handling instructions are highlighted (Box 410) for review. The current request is examined (Box 415) to determine if a new design is being requested. If the request is for a new design, the process is ended (Box 435). However, if the request is for an existing design, the version identification for each mask layer is compared for the current product and the requested product. The differences in the mask layers are identified (Box 425). A mask layer identification message is transmitted to the customer engineering representative 135 for verification and the procedure is completed (Box 435).

Figure 7:
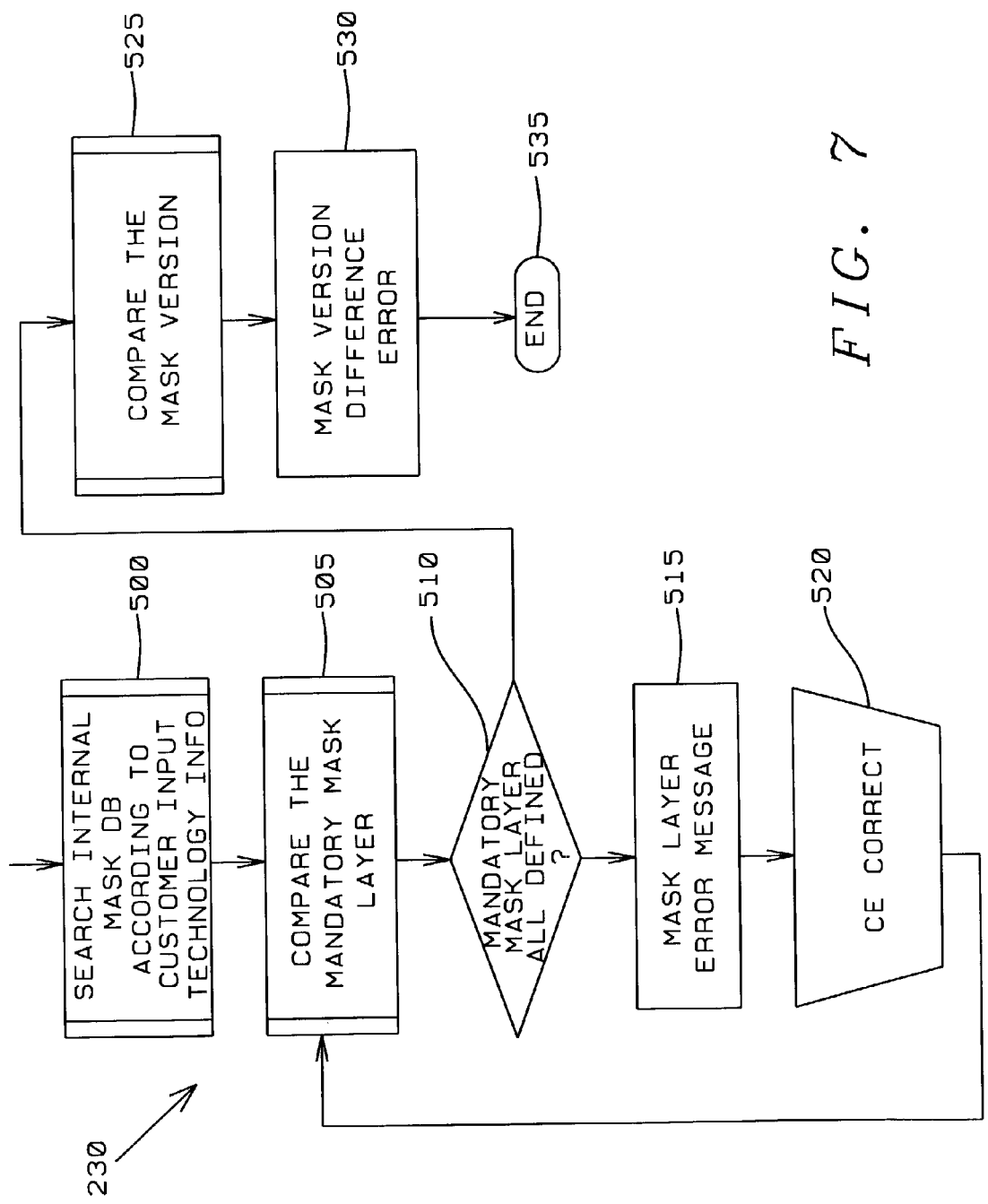

If the request for fabrication contains a foundry service request (Box 230), the verification execution unit 116 of FIG. 2 then performs (Box 500) a search of the customer's technology database within the product data management retention device, as shown in FIG. 7, to determine the masking levels required according to the technology established by the customer 100. The required masking layers are compared (Box 505) to the masking layers identified in the request for fabrication. The request for fabrication is verified (Box 510) to determine that all required masks are present in the request for fabrication. If all the required masks are not present in the request for fabrication, an error message is generated (Box 515) and transferred to the customer engineering representative 135. The customer engineering representative 135 provides (Box 520) the missing layers either by correction of the request for fabrication that misidentified a mask or by communication with the customer to acquire the necessary mask.

The masking layers of the request for fabrication and the required masking layers are then compared (Box 505) again to ensure that all the required layers are present in the request for fabrication. When all the required masking layers are present, the version identification for the masks of the request for fabrication are compared (Box 525) with previous similar product produced to ensure that the current mask levels are identified. If any of the version identifications are incorrect, an error message is generated (Box 530) and communicated to the customer engineering representative 135. The customer engineering representative 135 either corrects the version numbering or communicates with the customer 100 to acquire the mask at the correct version level.

It is well known in the art that while the above describes a method and system for verification of a request for fabrication of a product, the system as described is, in fact, implemented as program code for execution on a computing system. The program code is retained in media such as storage nodes of the cluster network of computer systems or a global communication network such as the Internet, or stored on storage media such as a read only memory (ROM), an electro-optical disk or a magnetic disk. The program code executed by the computing system executes the procedure implemented by the verification execution unit 116 of FIG. 2

While this invention has been particularly shown and described with reference to the preferred embodiments thereof, it will be understood by those skilled in the art that various changes in form and details may be made without departing from the spirit and scope of the invention

The invention claimed is:

1. A method comprising processing and verifying a request to a fabricating organization for manufacture of a product, including the steps of:
   receiving said request for manufacture of the product, said request including a product design for the product;

verifying that a format and syntax of said request complies with requirements for format and syntax of said request, where said format and syntax of said request are not part of said product design;

if said format and syntax does not comply with said requirements for said format and syntax, rejecting said request for manufacture;

if said format and syntax has minor non-compliances with said requirements for format and syntax, correcting said minor non-compliances such that said request is in compliance with the requirements for format and syntax; and if said format and syntax is in compliance with said requirements, transferring said request to initiate manufacture of said product.

2. The method of claim 1 further comprising acknowledging receipt of said request.

3. The method of claim 2 wherein acknowledging receipt of said request comprises the step of automatically creating an electronic message containing an acknowledgement receipt.

4. The method of claim 1 wherein verifying comprises the steps of:

examining the request for manufacture to verify that tools required for the manufacture are correctly identified;

examining the request for manufacture to verify that process steps required for the manufacture are correctly identified; and examining the request for manufacture to verify that product fabrication instructions required for the manufacture have a correct syntax.

5. The method of claim 4 wherein examining the request for manufacture to verify that the tools required are correctly identified comprises the steps of:

determining if specific tooling is required;

if specific tooling is required, determining if tooling decisions are required;

if tooling decision are required, examining said request that instructions for said tooling decisions have correct syntax;

if the instructions have an incorrect syntax, generating an error message to have said instructions for said tooling decisions corrected; and upon receipt of said message to have said instructions for said tooling decisions corrected, correcting said instructions for said tooling decisions.

6. The method of claim 4 wherein examining the request for manufacture to verify that the tools required are correctly identified comprises the steps of:

determining if specific tooling is required;

if specific tooling is required, determining if any specific tooling instructions are incomplete;

if any specific tooling instructions are incomplete, correcting said specific tooling instructions;

determining that said specific tooling instruction comply with the format for manufacture of said product; and if said specific tooling instructions do not comply with the format for manufacture of said product, correcting said specific tooling instructions.

7. The method of claim 4 wherein examining the request for manufacture to verify that process steps required for the manufacture are correctly identified comprises the steps of:

determining if special process steps for the manufacture of the product are required;

comparing special process steps for the manufacture of the product to determine that said process steps are equivalent to process steps of similar product being manufactured;

identifying said special process steps differing from the process steps of the similar product; and verifying that the special process steps differing from the process steps of similar product being manufactured.

8. The method of claim 4 wherein examining the request for manufacture to verify that the product fabrication instructions required for the manufacture have a correct syntax comprises the steps of:

comparing the product fabrication instructions required for the manufacture with product fabrication instruction for previous similar product;

if the product fabrication instructions do not compare correctly, correcting said product fabrication instructions; and if the product fabrication instruction do compare correctly, assessing that said product fabrication instructions comply with rules for syntax.

9. The method of claim 4 wherein the tools required for the fabrication of the product are descriptions of masks employed in fabrication of the electronic circuits on a substrate.

10. The method of claim 4 wherein the process steps for the fabrication of the product are lot handling instructions employed during fabrication of electronic circuits on the substrate.

11. The method of claim 4 wherein the product fabrication instructions for manufacture of the product describe masking level details for masks employed for fabrication of electronic circuits on the substrate.

12. An apparatus comprising means for processing and verifying a request of a fabricating organization for manufacture of a product, including:

means for receiving said request for manufacture of the product, said request including a product design for the product;

means for verifying that a format and syntax of said request complies with requirements for format and syntax of said request, where said format and syntax of said request are not part of said product design;

means for rejecting said request for manufacture, if said format and syntax does not comply with said requirements for said format and syntax;

means for correcting minor non-compliances such that said request is in compliance to with the requirements for format and syntax, if said format and syntax has said minor non-compliances with said requirements for format and syntax; and means for transferring said request to initiate manufacture of said product, if said format and syntax is in compliance with said requirements.

13. The apparatus of claim 12 further comprising means for acknowledging receipt of said request.

14. The apparatus of claim 13 wherein the means for acknowledging receipt of said request comprises means for automatically creating an electronic message containing an acknowledgement receipt.

15. The apparatus of claim 12 wherein verifying comprises:

means for examining the request for manufacture to verify that tools required for the manufacture are correctly identified;

means for examining the request for manufacture to verify that process steps required for the manufacture are correctly identified; and means for examining the request for manufacture to verify that product fabrication instructions required for the manufacture have a correct syntax.

16. The apparatus of claim 15 wherein the means for examining the request for manufacture to verify that the tools required are correctly identified comprises:

means for determining if specific tooling is required;

means for determining if tooling decisions are required, if specific tooling is required;

means for examining said request that instructions for said tooling decisions have correct syntax, if tooling decision are required;

means for generating an error message to have said instructions for said tooling decisions corrected, if the instructions have an incorrect syntax; and means for correcting said instructions for said tooling decisions, upon receipt of said message to have said instructions for said tooling decisions corrected.

17. The apparatus of claim 15 wherein means for examining the request for manufacture to verify that the tools required are correctly identified comprises:

means for determining if specific tooling is required;

means for determining if any specific tooling instructions are incomplete, if specific tooling is required;

means for correcting said specific tooling instructions, if any specific tooling instructions are incomplete;

means for determining that said specific tooling instruction comply with the format for manufacture of said product; and means for correcting said specific tooling instructions, if said specific tooling instruction do not comply with the format for manufacture of said product.

18. The apparatus of claim 15 wherein means for examining the request for manufacture to verify that process steps required for the manufacture are correctly identified comprises:

means for determining if special process steps for the manufacture of the product are required;

means for comparing special process steps for the manufacture of the product to determine that said process steps are equivalent to process steps of similar product being manufactured;

means for identifying said special process steps differing from the process steps of the similar product; and means for verifying that the special process steps differing from the process steps of similar product being manufactured.

19. The apparatus of claim 15 wherein means for examining the request for manufacture to verify that the product fabrication instructions required for the manufacture have a correct syntax comprises:

means for comparing the product fabrication instructions required for the manufacture with product fabrication instruction for previous similar product;

means for correcting said product fabrication instructions, if the product fabrication instructions do not compare correctly; and means for assessing that said product fabrication instructions comply to rules for syntax, if the product fabrication instruction do compare correctly.

20. The apparatus of claim 15 wherein the tools required for the fabrication of the product are descriptions of masks employed in fabrication of the electronic circuits on a substrate.

21. The apparatus of claim 15 wherein the process steps for the fabrication of the product are lot handling instructions employed during fabrication of electronic circuits on the substrate.

22. The apparatus of claim 15 wherein the product fabrication instructions for manufacture of the product describe masking level details for masks employed for fabrication of electronic circuits on the substrate.

23. An apparatus comprising a request administration system to process and verify a request to a fabricating organization for manufacture of a product, including:

a first messaging device in communication with a customer of said fabricating organization for receiving said request for manufacture of the product, said request including a product design for the product;

a request verification device in communication with said request receiving device to substantiate that a format and syntax of said request complies with requirements for format and syntax of said request, where said format and syntax of said request are not part of said product design;

a second messaging device in communication with said customer and said request verification device for generating a rejection message indicating denial said request for manufacture, if said format and syntax does not comply with said requirements for said format and syntax;

a third messaging device in communication with a customer engineering representative such that said customer engineering representative corrects minor non-compliances to make said request is in compliance with the requirements for format and syntax, if said format and syntax has said minor non-compliances with said requirements for format and syntax; and a fourth messaging device in communication with a factory for transferring said request to said factory to initiate manufacture of said product, if said format and syntax is in compliance with said requirements.

24. The apparatus of claim 23 wherein the first messaging device generates a message to said customer, acknowledging receipt of said request.

25. The apparatus of claim 24 wherein said message is an electronic message acknowledging said receipt.

26. The apparatus of claim 23 wherein said request verification device executes the steps of:

examining the request for manufacture to verify that tools required for the manufacture are correctly identified;

examining the request for manufacture to verify that process steps required for the manufacture are correctly identified; and examining the request for manufacture to verify that product fabrication instructions required for the manufacture have a correct syntax.

27. The apparatus of claim 26 wherein the examining the request for manufacture to verify that the tools required are correctly identified comprises:

determining if specific tooling is required;

determining if tooling decisions are required, if specific tooling is required;

examining said request that instructions for said tooling decisions have correct syntax, if tooling decision are required;

generating an error message to have said instructions for said tooling decisions corrected, if the instructions have an incorrect syntax; and correcting said instructions for said tooling decisions, upon receipt of said message to have said instructions for said tooling decisions corrected.

28. The apparatus of claim 26 wherein examining the request for manufacture to verify that the tools required are correctly identified comprises the steps of:
    determining if specific tooling is required;
    determining if any specific tooling instructions are incomplete, if specific tooling is required;
    correcting said specific tooling instructions, if any specific tooling instructions are incomplete;
    determining that said specific tooling instruction comply with the format for manufacture of said product; and
    correcting said specific tooling instructions, if said specific tooling instruction do not comply with the format for manufacture of said product.

29. The apparatus of claim 26 wherein means for examining the request for manufacture to verify that process steps required for the manufacture are correctly identified comprises the steps of:
    determining if special process steps for the manufacture of the product are required;
    comparing special process steps for the manufacture of the product to determine that said process steps are equivalent to process steps of similar product being manufactured;
    identifying said special process steps differing from the process steps of the similar product; and
    verifying that the special process steps differing from the process steps of similar product being manufactured.

30. The apparatus of claim 26 wherein examining the request for manufacture to verify that the product fabrication instructions required for the manufacture have a correct syntax comprises the steps of:
    comparing the product fabrication instructions required for the manufacture with product fabrication instruction for previous similar product;
    means for correcting said product fabrication instructions, if the product fabrication instructions do not compare correctly; and
    means for assessing that said product fabrication instructions comply to rules for syntax, if the product fabrication instruction do compare correctly.

31. The apparatus of claim 26 wherein the tools required for the fabrication of the product are descriptions of masks employed in fabrication of the electronic circuits on a substrate.

32. The apparatus of claim 26 wherein the process steps for the fabrication of the product are lot handling instructions employed during fabrication of electronic circuits on the substrate.

33. The apparatus of claim 26 wherein the product fabrication instructions for manufacture of the product describe masking level details for masks employed for fabrication of electronic circuits on the substrate.

34. An apparatus comprising a computing system having an execution unit, at least data and instruction retention unit and a plurality of input/output devices for processing and verifying a request to a fabricating organization for manufacture of a product, said system being responsive to execution of a program by said esecution unit for:
    receiving from a customer in communication with at least one of said input/output devices said request for manufacture of the product, said request including a product design for the product;
    verifying that a format and syntax of said request complies with requirements for format and syntax of said request, where said format and syntax of said request are not part of said product design;
    if said format and syntax does not comply with said requirements for said format and syntax, transmitting a message to said customer through at least one of the input/output devices rejecting said request for manufacture;
    if said format and syntax has minor non-compliances with said requirements for format and syntax, instructing a customer engineering representative through at least one of said input/output devices to correct said minor non-compliances such that said request is in compliance with the requirements for format and syntax; and
    if said format and syntax is in compliance with said requirements, transferring through at least one of said input/output devices said request to initiate manufacture of said product.

35. The apparatus of claim 34 wherein executing further comprises the step of acknowledging receipt of said request.

36. The apparatus of claim 35 wherein acknowledging receipt of said request comprises the step of automatically creating an electronic message containing an acknowledgement receipt for transmission to said customer through at least one of said input/output devices.

37. The apparatus of claim 34 wherein verifying comprises the steps of:
    examining the request for manufacture to verify that tools required for the manufacture are correctly identified;
    examining the request for manufacture to verify that process steps required for the manufacture are correctly identified; and
    examining the request for manufacture to verify that product fabrication instructions required for the manufacture have a correct syntax.

38. The apparatus of claim 37 wherein examining the request for manufacture to verify that the tools required are correctly identified comprises the steps of:
    determining if specific tooling is required;
    if specific tooling is required, determining if tooling decisions are required;
    if tooling decision are required, examining said request that instructions for said tooling decisions have correct syntax;
    if the instructions have an incorrect syntax, generating an error message for transmission to said customer service representative through at least one of said input/output devices to have said instructions for said tooling decisions corrected; and
    upon receipt of said message to have said instructions for said tooling decisions corrected by said customer engineering representative; said customer engineer institutes correcting said instructions for said tooling decisions.

39. The apparatus of claim 37 wherein examining the request for manufacture to verify that the tools required are correctly identified comprises the steps of:
    determining if specific tooling is required;
    if specific tooling is required, determining if any specific tooling instructions are incomplete;
    if any specific tooling instructions are incomplete, transmitting a message to said customer engineering representative through said input/output devices instructing correcting said specific tooling instructions;
    determining that said specific tooling instruction comply with the format for manufacture of said product; and
    if said specific tooling instruction do not comply with the format for manufacture of said product, transmitting a message to said customer engineering representative through said input/output devices instructing correcting said specific tooling instructions.

40. The apparatus of claim 37 wherein examining the request for manufacture to verify that process steps required for the manufacture are correctly identified comprises the steps of:
   determining if special process steps for the manufacture of the product are required;
   comparing special process steps for the manufacture of the product to determine that said process steps are equivalent to process steps of similar product being manufactured;
   identifying said special process steps differing from the process steps of the similar product; and
   verifying that the special process steps differing from the process steps of similar product being manufactured.

41. The apparatus of claim 37 wherein examining the request for manufacture to verify that the product fabrication instructions required for the manufacture have a correct syntax comprises the steps of:
   comparing the product fabrication instructions required for the manufacture with product fabrication instruction for previous similar product;
   if the product fabrication instructions do not compare correctly, transmitting a message to said customer engineering representative through said input/output devices instructing correcting said product fabrication instructions; and
   if the product fabrication instruction do compare correctly, assessing that said product fabrication instructions comply with rules for syntax.

42. The apparatus of claim 37 wherein the tools required for the fabrication of the product are descriptions of masks employed in fabrication of the electronic circuits on a substrate.

43. The apparatus of claim 37 wherein the process steps for the fabrication of the product are lot handling instructions employed during fabrication of electronic circuits on the substrate.

44. The apparatus of claim 37 wherein the product fabrication instructions for manufacture of the product describe masking level details for masks employed for fabrication of electronic circuits on the substrate.

45. A medium for retaining a computer program which, when executed on a computing system, executes a process for processing and verifying a request of a fabricating organization for manufacture of a product, including the steps of:
   receiving said request for manufacture of the product, said request including a product design for the product;
   verifying that a format and syntax of said request complies with requirements for format and syntax of said request, where said format and syntax of said request are not part of said product design;
   if said format and syntax does not comply with said requirements for said format and syntax, rejecting said request for manufacture;
   if said format and syntax has minor non-compliances with said requirements for format and syntax, correcting said minor non-compliances such that said request is in compliance with the requirements for format and syntax; and
   if said format and syntax is in compliance with said requirements, transferring said request to initiate manufacture of said product.

46. The medium for retaining a computer program of claim 45 further comprising acknowledging receipt of said request.

47. The medium for retaining a computer program of claim 46 wherein acknowledging receipt of said request comprises the step of automatically creating an electronic message containing an acknowledgement receipt.

48. The medium for retaining a computer program of claim 45 wherein verifying comprises the steps of:
   examining the request for manufacture to verify that tools required for the manufacture are correctly identified;
   examining the request for manufacture to verify that process steps required for the manufacture are correctly identified; and
   examining the request for manufacture to verify that product fabrication instructions required for the manufacture have a correct syntax.

49. The medium for retaining a computer program of claim 48 wherein examining the request for manufacture to verify that the tools required are correctly identified comprises the steps of:
   determining if specific tooling is required;
   if specific tooling is required, determining if tooling decisions are required;
   if tooling decision are required, examining said request that instructions for said tooling decisions have correct syntax;
   if the instructions have an incorrect syntax, generating an error message to have said instructions for said tooling decisions corrected; and
   upon receipt of said message to have said instructions for said tooling decisions corrected, correcting said instructions for said tooling decisions.

50. The medium for retaining a computer program of claim 48 wherein examining the request for manufacture to verify that the tools required are correctly identified comprises the steps of:
   determining if specific tooling is required;
   if specific tooling is required, determining if any specific tooling instructions are incomplete;
   if any specific tooling instructions are incomplete, correcting said specific tooling instructions;
   determining that said specific tooling instruction comply with the format for manufacture of said product; and
   if said specific tooling instruction do not comply with the format for manufacture of said product, correcting said specific tooling instructions.

51. The medium for retaining a computer program of claim 48 wherein examining the request for manufacture to verify that process steps required for the manufacture are correctly identified comprises the steps of:
   determining if special process steps for the manufacture of the product are required;
   comparing special process steps for the manufacture of the product to determine that said process steps are equivalent to process steps of similar product being manufactured;
   identifying said special process steps differing from the process steps of the similar product; and
   verifying that the special process steps differing from the process steps of similar product being manufactured.

52. The medium for retaining a computer program of claim 48 wherein examining the request for manufacture to verify that the product fabrication instructions required for the manufacture have a correct syntax comprises the steps of:

comparing the product fabrication instructions required for the manufacture with product fabrication instruction for previous similar product;

if the product fabrication instructions do not compare correctly, correcting said product fabrication instructions; and if the product fabrication instruction do compare correctly, assessing that said product fabrication instructions comply with rules for syntax.

53. The medium for retaining a computer program of claim 48 wherein the tools required for the fabrication of the product are descriptions of masks employed in fabrication of the electronic circuits on a substrate.

54. The medium for retaining a computer program of claim 48 wherein the process steps for the fabrication of the product are lot handling instructions employed during fabrication of electronic circuits on the substrate.

55. The medium for retaining a computer program of claim 48 wherein the product fabrication instructions for manufacture of the product describe masking level details for masks employed for fabrication of electronic circuits on the substrate.

* * * * *